United States Patent Office 2,858,347
Patented Oct. 28, 1958

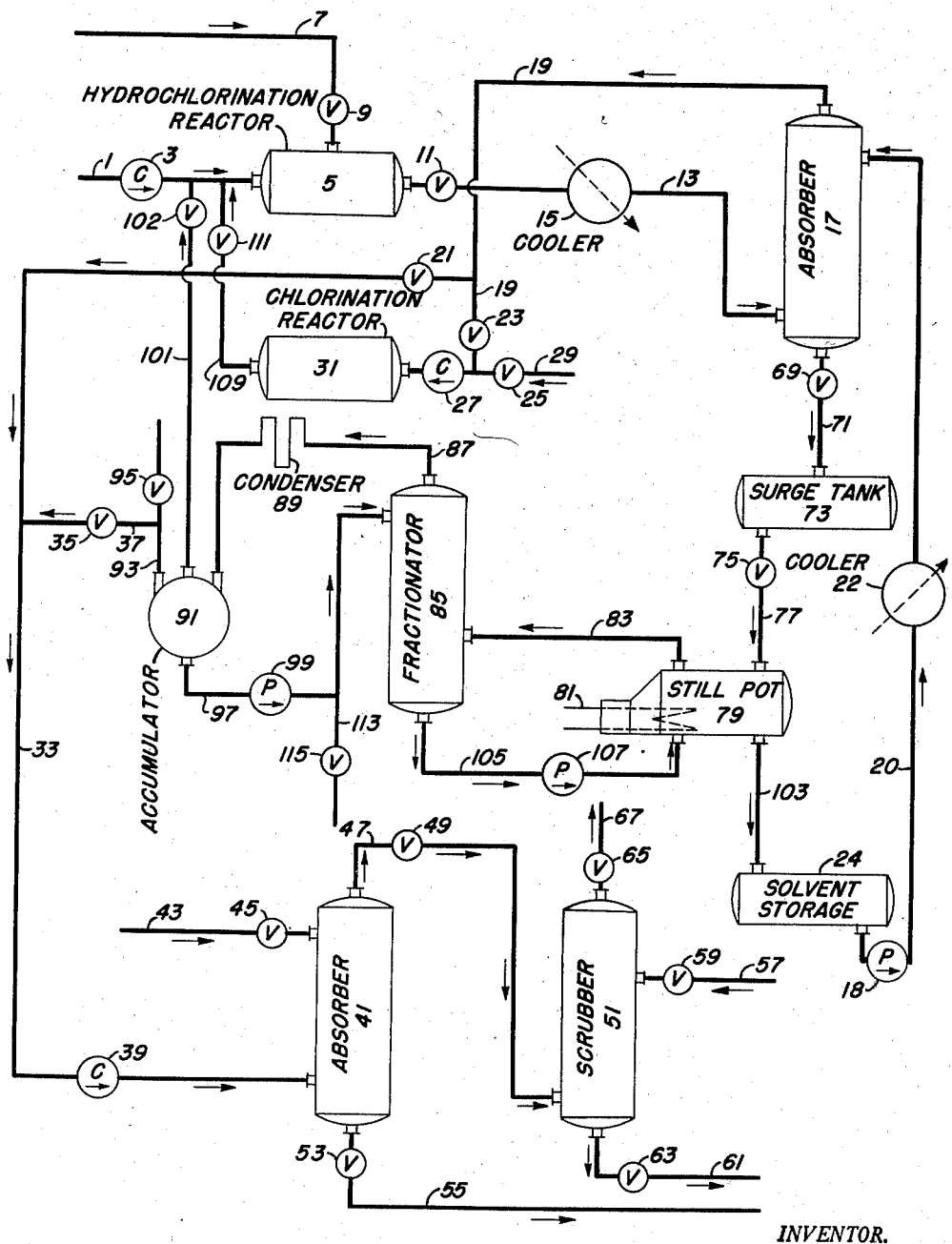

2,858,347

PROCESS FOR MANUFACTURING ALIPHATIC CHLORIDES

Le Roi E. Hutchings, Lakewood, Ill., assignor to The Pure Oil Company, Chicago, Ill., a corporation of Ohio Application August 26, 1954, Serial No. 452,439

6 Claims. (Cl. 260—656)

This invention relates to a process for the preparation of aliphatic chlorides from hydrocarbon-containing gases. More particularly, this invention relates to a process for the preparation, separation and recovery of vinyl chloride and other aliphatic chlorides from feed gas mixtures containing hydrogen, acetylene and variable amounts of other hydrocarbon gases.

Vinyl chloride is available as a starting material in the production of a variety of compounds, including plastics. Similarly, other aliphatic chlorides are of definite commercial importance. Vinyl chloride has been prepared for commercial use in the past by a number of methods, principally those involving dehydrochlorination of ethylene dichloride and hydrochlorination of acetylene.

The dehydrochlorination of ethylene dichloride is usually carried out by pyrolysis and produces vinyl chloride and large amounts of hydrogen chloride; also, in some variations of the process ethylene dichloride is reacted with caustic agents to produce vinyl chloride. The dehydrochlorination processes often produce large amounts of secondary products, contributing toward high production costs. Slightly more economical modifications employ the use of monohydric and dihydric alcohols in combination with caustic agents for the purpose of reducing the amounts of secondary products obtained. Among the disadvantages of methods depending upon the dehydrochlorination of ethylene dichloride are the necessity of utilizing a relatively expensive starting material, namely, the ethylene dichloride, and the difficulties in separating the vinyl chloride from the side products concomitantly produced therewith. Generally more feasible for commercial purposes are processes involving the production of vinyl chloride from acetylene by reaction with hydrogen chloride. This reaction is usually carried out in the presence of catalysts such as barium chloride and mercuric chloride impregnated on activated carbon, cuprous chloride in combination with an alkali metal or alkaline earth metal and the like under suitable conditions of temperature and pressure. Production of vinyl chloride by hydrochlorination processes, however, is usually hindered by the inability of said processes to convert acetylene into vinyl chloride and separate the resultant vinyl chloride in a sufficiently limited number of steps to keep operating costs low. Moreover, secondary materials produced during the hydrochlorination reaction when impure acetylene-containing gases are used as feed mixtures are not ordinarily recovered as commercially useful products. Therefore, production of vinyl chloride by hydrochlorination of acetylene has proved to be an expensive operation. More recently, vinyl chloride has been produced by reacting acetylene-containing gases with hydrogen chloride produced in the process stream by reaction of chlorine introduced into the stream with any hydrogen present in the stream. However, such an indiscriminate chlorination of the feed stream is attendant with difficulties; not only are a variety of products other than hydrogen chloride produced, but any chlorine left unreacted and in contact with vinyl chloride newly formed by reaction with the in-situ-produced hydrogen chloride acts as a polymerization catalyst for the vinyl chloride as well as other chlorides present, causing loss of desired product, fouling of catalyst and apparatus and enhanced difficulty in separating pure products from the system. The main features of the above two general methods of producing vinyl chloride are combined in newly developed processes wherein acetylene-containing gas is first selectively hydrochlorinated, and in a subsequent operation any ethylene remaining in said gas is chlorinated to form ethylene dichloride which is pyrolyzed to form vinyl chloride and hydrogen chloride, and the latter is recycled to complete the process. Such a method requires the presence of ethylene in the feed gas together with actylene and involves the operational steps of first producing ethylene dichloride and then decomposing it. Ethylene dichloride also may be used as the starting material in such a process, in which case the ethylene dichloride is pyrolyzed to vinyl chloride and hydrogen chloride. The hydrogen chloride then is separated from the reaction products and conducted to a zone where it is mixed with acetylene and passed over a suitable catalyst to form vinyl chloride. A disadvantage of this type of process lies in the utilization of a valuable chemical, ethylene dichloride, totally or partly externally obtained, to produce another chemical; that is, expense is involved. Where the ethylene dichloride is only partly externally obtained, the synthesis of the ethylene dichloride from ethylene in feed gas is a necessary process step, together with the above-mentioned splitting of ethylene dichloride. Thus, complicated procedure steps are necessary.

A process to be commercially feasible for the production of vinyl chloride requires a relatively cheap source of reactants and a minimal number of process steps. Preferably, it produces, separates and recovers not only vinyl chlorides but also any other commercially useful components produced during the processing.

Suitable impure acetylene-containing gases are those issuing as gaseous product effluent from such cracking processes as Schoch electric arc process and the Wulff regenerative furnace process, both employing natural gas, methane and other gaseous hydrocarbon-containing mixtures as feed. Cracking processes employing liquid hydrocarbon-containing material as feed are typified by the Griffin-Ediger process, which is essentially a hydrocarbon oil cracking process employing multiple electric arcs between mobile carbon electrodes to generate transient cracking temperatures and pressures. The Griffin-Ediger process produces gaseous mixtures containing acetylene in relatively high concentration and other hydrocarbons, together with hydrogen, which are acceptable for the production of aliphatic chlorides. A sample analysis of the Griffin-Ediger process products is as follows:

| | Percent by weight |
|---|---|
| Acetylene | 41.8 |
| Ethylene | 15.7 |
| Tail gas | 24.0 |
| Carbon black | 18.5 |

The tail gas of the product is composed of:

| | Percent by weight |
|---|---|
| $H_2$ | 24.6 |
| $CH_4$ | 11.5 |
| $C_4H_6$ | 6.2 |
| $C_3H_4$ | 9.3 |
| $C_3H_6$ | 1.9 |
| $C_4H_2$ | 20.3 |
| $C_4H_4$ | 14.5 |
| $C_4H_6$ | 6.2 |
| Other | 5.5 |

The Griffin-Ediger product gas mixture has a low methane content, as seen in the above composition and that of Example I below, in comparison with gas mixture obtained from other cracking processes. Acetylene as such is recoverable with difficulty from the gaseous product mixtures of the above cracking processes, since other hydrocarbon gases of similar characteristics, including boiling points and solubilities in various solvents, are present together with hydrogen; therefore, a method to economically recover acetylene and the other hydrocarbons present in such a mixture in purified form would represent a welcome advancement in the art.

I have invented an integrated process for the substantially total utilization of acetylene and hydrogen, together with other suitable gaseous hydrocarbons which may be present in a gaseous feed mixture, such as the product gas mixture of the Griffin-Ediger process. The acetylene and other gaseous hydrocarbons in my process are removed from the gaseous feed stream by conversion to vinyl chloride and similar commercially utilizable aliphatic chlorides and the vinyl chloride and other aliphatic chlorides are recovered separately in purified form. My process also entails the production of hydrogen chloride therein, so that an externally obtained hydrogen chloride is not utilized for the efficient operation of the process beyond an initial step. My process is commercially important in that it uses cheap, impure feed gas mixtures and produces a high proportion of commercially valuable products in a minimum number of steps without substantial production of catalyst- and equipment-fouling, non-utilizable polymers which render separation of desired products difficult.

Therefore, it is an object of my invention to provide a method for the substantially total preparation, separation and recovery of vinyl and other aliphatic chlorides from a gaseous mixture containing hydrogen, acetylene and, optionally, other gaseous hydrocarbons. It is another object of my invention to provide a method of preparation of vinyl chloride and other aliphatic chlorides, with associated regeneration of hydrogen chloride, without the substantial production of interfering secondary products, such as polymers. It is another object of my invention to provide a simple, economical, integrated process for the production of vinyl and other aliphatic chlorides wherein hydrogen chloride reactant is produced both from hydrogen contained in the feed stream and from the chlorination of lower alkanes. It is another object of my invention to provide an integrated process for the production of vinyl and other chlorides wherein after the initial addition of hydrogen chloride to the hydrogen- and acetylene-containing feed gas, only chlorine and feed gas need be added to continue the process. It is another object of my invention to utilize a gaseous feed source which need contain only acetylene and hydrogen to produce vinyl chloride.

In outline, my process may be described as comprising the steps of intially hydrochlorinating a gaseous mixture containing at least hydrogen and acetylene by initial reaction with an externally-obtained hydrogen chloride, separating at least vinyl chloride from the reaction product gas, reacting hydrogen in the gaseous effluent with chlorine to produce hydrogen chloride and passing it to the hydrochlorination step to substitute for the externally-obtained hydrogen chloride initially necessary, and separating vinyl chloride. Additionally, combustible hydrocarbon components in said gaseous product stream may be separated, purified and utilized for fuel gas, and suitable gaseous hydrocarbons present in the feed gas are converted into and separated and recovered as valuable aliphatic chlorides.

It is obvious that the hydrogen chloride necessary for the initial reaction may be obtained internally rather than externally by preliminarily running part of the feed gas into the chlorinator and producing a hydrogen chloride-containing gas. Alternatively, any hydrogen-containing gas or pure hydrogen may be run to the chlorinator and converted to hydrogen chloride, which may be introduced into the hydrochlorinator after separation from any other constituents present in the gas or without said separation. If feed gas is preliminarily chlorinated, some difficulties as afore-mentioned concerning catalyst fouling and the like may actually occur, but are temporary since the impure hydrogen chloride containing mixture is only used to start the process, subsequent regular production of hydrogen chloride being non-fouling during normal operation of the process.

More particularly, my invention provides for the separation of vinyl and other chlorides from the product gas of a hydrocarbon cracking process, such as the Griffin-Ediger mobile electrode electric arc cracking process, after hydrochlorination at suitable conditions in the presence of a catalyst in order to provide suitable effluent for chlorination to hydrogen chloride, without concomitant production of undesirable and process-interfering products, and without the necessity of first producing ethylene dichloride in order to generate hydrogen chloride for recycling to the hydrochlorination step. A particular point of novelty in my invention resides in the separation of vinyl chloride and any other aliphatic chlorides produced by hydrochlorination of acetylene and hydrogen-containing gas mixtures, preferably by counter-current extraction in an absorber, in order to avoid subsequent polymerization of the chlorides during preparation of the gaseous mixture. The chlorides are thus separated from undesirable components and protected against chlorine and the operating conditions for chlorination, so that the chlorides are more easily recoverable in larger yields.

Thus, it will be seen from the particular embodiments and more general discussion of this specification that this invention process provides substantially total recovery of utilizable hydrocarbons and hydrogen from a gaseous stream, such as the product gas of the Griffin-Ediger process, in the form of vinyl chloride and other commercially utilizable aliphatic chlorides. Such production, separation, and individual recovery of valuable products renders the process commercially feasible and utilizes a relatively cheap source of acetylenes and other hydrocarbon gases. Additionally, it provides for the production of fuel gas when so desired. Production of vinyl chloride is increased, fouling of catalyst and equipment being avoided by providing a chloride separation step after hydrochlorination of the feed gas and before chlorination of the gas to produce hydrogen chloride.

This invention ot only resides in the specific embodiments and the steps thereof, but also in the relationship of the steps to each other and the cooperation between said steps to provide an integrated process.

In order to more particularly point out my invention, reference is now made to the accompanying flow diagram depicting an embodiment of my invention. Gaseous feed mixture comprising at least acetylene and hydrogen, and which optionally may also include acetylenic homologs, ethylenes, lower alkanes and other normally gaseous hydrocarbons, obtained as product gas of any suitable process, such as hydrocarbon cracking process, e. g., the Griffin-Ediger process, the Schoch electric arc process and the Wulff regenerative furnace process, enters the system through line 1 and compressor 3, passing to hydrochlorination reactor 5. Said hydrochlorination reactor 5 may be of any suitable type, such as an externally heated tubular unit type reactor, the operating conditions of reactor 5 being dependent on the catalyst employed and composition of the gaseous stream. The acetylene in the gaseous feed mixture in said hydrochlorination reactor 5 reacts with hydrogen chloride, newly introduced to said reactor 5 through valve 9 and line 7 from an external source; alternatively, the hydrogen cholride may be introduced to said hydrochlorination reactor 5 in the initial reaction through lines 109 and 1 and valve 111 in the case where the initial hydrogen chloride has been generated in the chlorination reactor 31 from any hydrogen-containing gas. If desired, purification of the hydrogen chloride so produced in the chlorination reactor 31 may be employed before said hydrogen chloride is introduced into hydrochlorination reactor 5; suitable apparatus is obvious to one skilled in the art and is not depicted in the accompanying flow diagram. The acetylene and hydrogen chloride react in the presence of a suitable hydrochlorination-promoting catalyst, such as a metal chloride, for example, bismuth chloride, iron chloride, antimony chloride, zirconium chloride, aluminum chloride, or a metallic chloride mixture, for example, barium chloride-mercury chlordie or copper chloride-ammonium chloride. Other suitable catalysts are hydrous metal oxide gels and organic peroxides. The catalyst may be present in hydrochlorination reactor 5 as a circulating or fixed bed, with or without a supporting medium, such as pumice or activated carbon.

In one case, vinyl chloride is produced by the reaction between acetylene and hydrogen chloride at 120–180° C. temperature and substantially atmospheric pressure with a barium chloride-mercuric chloride on activated carbon catalyst in said reactor 5. Ethyl chloride and other aliphatic chlorides are simultaneously produced by reaction of the hydrogen chloride with any other suitable gaseous hydrocarbons present in the feed gas mixture in said reactor 5. The gaseous products are removed from reactor 5 through valve 11 and line 13 and pass through cooler 15 and into absorber 17 at a point near the bottom thereof. Absorber 17 may be of any countercurrent contacting type, such as a tower filled with Raschig rings, ceramic packing, bubble cap trays, wire screening or any other suitable means for securing intimate contact between introduced gases and absorbing medium, and is operated at −10° C. temperature and substantially atmospheric pressure when using trichloroethylene as absorbent.

The reaction product mixture countercurrently contacts in absorber 17 a descending stream of solvent, such as gas oil, heavy naphtha or a higher boiling alkene chloride, such as trichloroethylene, which has been introduced into absorber 17 through pump 18, line 20 and cooler 22 from solvent storage receptacle 24. The hydrogen, excess hydrogen chloride and lower boiling components comprising any light alkanes and some unreacted acetylenes and ethylenes present in the feed gas mixture pass out of the top of absorber 17 into line 19 and are conveyed, with valves 21 and 25 closed through open compressor 27, and line 29 into chlorination reactor 31.

A part of the gaseous effluent from the top of absorber 17 may be diverted to vent for fuel gas by opening valve 21 in line 33 and keeping valve 35 in line 37 closed. Such gas which is diverted into line 33 is compressed in compressor 39 and passed to absorber 41 which may be of any suitable countercurrent contacting type, such as a vertical tower filled with Raschig rings, ceramic packing, bubble cap trays, wire screening or any other suitable means for securing intimate contact between the introduced gases and the absorbing medium. Absorber 41 operates at ambinet temperatures and substantially atmospheric pressure, and the entering gases in absorber 41 rise countercurrent to descending water or other suitable solvent which is introduced through line 43 and valve 45. The solvent removes the hydrogen chloride present in the rising gases. The treated gases then pass out of absorber 41 through line 47 and valve 49 into the bottom of scrubber 51, which may be of any suitable countercurrent type and operates at ambinet temperature and substantially atmospheric pressure. The water or other solvent used in absorber 41 passes out of said absorber through valve 53 and line 55. The gases entering scrubber 51 rise countercurrent to descending alkaline solution, such as dilute caustic soda, which enters scrubber 51 through line 57 and valve 59. The alkaline agent neutralizes and removes any acidity remaining in the rising gases. Scrubber 51 operates at ambinet temperature and substantially atmospheric pressure. Spent alkaline solution passes from scrubber 51 through line 61 and valve 63, while the neutralized gases pass out of scrubber 51 through valve 65 and line 67.

After countercurrently contacting rising gases, the solvent in absorber 17 contains absorbed chlorides and any unreacted acetylenes and ethylenes originally present in the feed gas mixture and not remaining in the gaseous effluent passing from absorber 17 through line 19. Said solvent is taken from the bottom of absorber 17 through valve 69 and line 71 into surge tank 73 operating at ambient temperature which produces super-atmospheric pressure.

When a solvent more selective than gas oil for acetylenes is used in absorber 17, almost all the unreacted acetylenes present in the gas mixture fed into absorber 17 through line 13 are absorbed. Such a highly selective solvent is acetone, although di-methoxy-tetra-ethyleneglycol, diethyl carbonate, dimethyl formamide, N-methyl-2-pyrrolidone, carbitol, triethoxy ethyl phosphate, furfural, ethylene chlorhydrin, propionitrile, dichlorethyl ether, trimethyl phosphate, triethyl phosphate, tri-n-propyl phosphate, tri-n-butyl phosphate, trioctyl phosphate, tri-n-propyl phosphite, diethyl phosphate mono-diethyl amide, diethyl phosphate mono-dimethylamine and a number of other solvents are effective in absorbing acetylenes.

In the batch-wise process, the enriched solvent is removed from surge tank 73 through valve 75 and line 77 into still pot 79 operating at substantially atmospheric pressure. On application of heat to the solvent in still pot 79 by the introduction of steam or other heating means through line 81, absorbed chlorides, acetylenes, and ethylenes are stripped therefrom and pass through line 83 into fractionator 85, which may be of any suitable type such as a bubble cap column.

Vinyl chloride and any other aliphatic chlorides present are taken from fractionator 85 as consecutive fractions in the order of decreasing volatility. Fresh solvent may be used as reflux to achieve more efficient separation of the various aliphatic chlorides and may enter fractionator 85 through line 97 from accumulator 91 or from another source in a manner obvious to one skilled in the art. If the products are taken off as gas, they leave fractionator 85 through line 87, pass through condenser 89 and accumulator 91 into line 93, and out of the system through valve 95, valve 35 remaining closed. Thus, for example, vinyl chloride, ethyl chloride, dichloroethane and mixed heavier aliphatic chlorides are recovered consecutively in a typical operation. If the products are taken from the system as a liquid, they are drawn off through line 113, and valve 115. Condensed product or solvent is recycled from accumulator 91 for refluxing in fractionator 85 by passage through line 97 and pump 99. Acetylenes and ethylenes separated in fractionator 85 from the chlorides pass through line 87 and condenser 89 to accumulator 91, and are recycled to hydrochlorination reactor 5 through line 101, valve 102, and line 1.

Any hydrocarbons desirable for use as fuel gas, such as butenes, recovered in accumulator 91 as effluent from the fractionation of the chlorides-containing gas mixture are passed through lines 93 and 37, valve 95 being closed and valve 35 being open, and into line 33 for the above-described treatment to prepare for fuel gas. The solvent stripped of absorbed chlorides, ethylenes and acetylenes in still pot 79 is removed from still pot 79 through line 103 and passes to solvent storage receptacle 24 for recycling through pump 18, line 20, and cooler 22 to absorber 17. Lean solvent appearing as residue from fractionator 85 is recycled through line 105 and pump 107 to still pot 79, and may be removed therefrom through line 103 to solvent storage receptacle 24. When the process is continuous rather than batchwise, instead of the still pot fractionator arrangement depicted in the accompanying schematic flow diagram for the separation and recovery of absorbed chlorides, and the recycling of ethylenes, acetylenes and other absorbed hydrocarbons, a series of suitable fractionating columns may be employed. Equipment and conditions of operation would be obvious to one skilled in the art to effect the changes from a batch to a continuous operation.

The gaseous effluent taken from the top of absorber 17 and passed through line 19, valve 23, line 29, and compressor 27 to chlorination reactor 31 is composed predominantly of hydrogen and lower alkanes. It is reacted in chlorination reactor 31 with chlorine which has been introduced into said reactor 31 through line 29, in the presence of a suitable chlorination-promoting catalyst, such as activated carbon, a metal chloride, for example, antimony chloride, calcium chloride, tin chloride, bismuth chloride, aluminum chloride, arsenic chloride or a chloride mixture, for example, iron chloride-titanium chloride. Activated carbon impregnated with active metals or metal chlorides is also suitable as a chlorinating-promoting catalyst, as are a number of other catalysts. The desired catalyst is present in chlorination reactor 31 in any suitable form, such as a fixed bed, with or without a supporting medium, or as a fluidized bed.

Hydrogen reacts with chlorine in reactor 31 to produce hydrogen chloride and aliphatic hydrocarbons react with the chlorine to produce organic chlorides and additional amounts of hydrogen chloride. The products of the reactions occurring in reactor 31 are removed from reactor 31 through line 109 and valve 111 and pass therethrough into line 1 leading to hydrochlorination reactor 5. The above described hydrochlorination, separation, and subsequent steps are repeated until the process is stopped, except that after the initial introduction of externally obtained hydrogen chloride, or hydrogen chloride generated by preliminarily chlorinating feed gas or other hydrogen-containing gas in the chlorination reactor, sufficient amounts of hydrogen chloride are generated within the system utilizing effluent from absorber 17. This is chlorinated in the chlorination step during the operation of the process, with the consequent production of the desired hydrogen chloride. This process may be operated continuously or intermittently. Only acetylene-containing and hydrogen-containing feed and chlorine need be added to the system during continuous operation after the initial introduction of hydrogen chloride. After such process shut-down and before resumption of operations, the advisability of adding hydrogen chloride to the hydrochlorination reactor will hinge upon the amount present in said hydrochlorination reactor.

By the term "externally-obtained hydrogen chloride" is meant hydrogen chloride added to the system from an external source, and not generated by the chlorination step of the process, or by a preliminary hydrogen chloride-producing step.

The following example will illustrate the practice of my invention according to a preferred mode of operation, but is not to be construed as limiting the same:

*Example I*

A feed gas mixture obtained from the Griffin-Ediger process and having the following composition

| | Vol. percent |
|---|---|
| Acetylene | 28.6 |
| Ethylene | 9.9 |
| Hydrogen | 52.3 |
| Methane | 3.2 |
| Ethane | 0.9 |
| $C_3H_4$ | 1.1 |
| $C_3H_6$ | 0.2 |
| $C_4H_2$ | 1.8 |
| $C_4H_4$ | 1.2 |
| $C_4H_6$ | 0.5 |
| Other | 0.3 |
| | 100.0 | is processed. Initially, 14.8 volumes of this feed gas per 100 volumes of available feed gas, along with 17.7 volumes of chlorine per 100 volumes of available feed gas, are charged to a chlorination reactor which is a standard, water-cooled chlorine burner for the production of hydrogen chloride. The hydrogen chloride so produced then is reacted with 100 volumes of feed gas in a hydrochlorination reactor at about 140° C. and 5 p. s. i. g. in the presence of a solid catalyst of the following composition: 35 weight-percent of barium chloride and 0.75 weight-percent of mercuric chloride deposited on activated carbon. Vinyl chloride is produced, together with some ethyl chloride and small amounts of other chlorides and dichlorides originating from both the chlorination reactor and the hydrochlorination reactor. The product gas mixture from the hydrochlorination is passed to a gas absorber having Raschig ring packing and operating at 3 p. s. i. g. and at —10° C., where it is counter-currently contacted with trichloroethylene to absorb vinyl chloride, ethyl chloride and other aliphatic chlorides present. Effluent gas, comprising mainly hydrogen, ethylene, methane and traces of acetylene, is taken from the gas absorber and passed to the chlorination reactor and to the fuel gas scrubber system. Said effluent gas in the amount of 14.8 volumes per 100 volumes of feed gas is used to replace the feed gas stream initially charged to the chlorination reactor, while the remainder of the effluent (about 51.5 volumes) is sent to an absorber in the fuel gas system in order to recover fuel gas therefrom. No attempt is made to recover chlorides from the chlorination process, though this can be done. The reduced temperatures of this process prevent appreciable chlorination of the hydrocarbons to hydrogen chloride and carbon, the carbon reduction being a distinct advantage over processes operating at higher temperature levels. The presence of only a small amount of methane in Griffin-Ediger product gas also contributes to reduced carbon formation.

The chlorides-enriched trichloroethylene absorbent obtained in the gas absorption step is passed to a surge tank operating at a slight pressure and ambient temperature, and thence to a still pot where the absorbent is recovered and recycled to the gas absorption step. The desired chlorides are separated one by one from the absorbent by means of a fractionator connected to the still pot. Some of the products are taken off largely as gas and others as liquids. In general, the component being removed is used as reflux; fresh absorbent, or the absorbent carried along with a product, may be used as reflux where desired. The gas sent to the absorber in the fuel gas recovery system for purification prior to use as fuel gas is washed with water in said absorber to remove most of the hydrochloric acid and then with caustic in a scrubber where the last traces of hydrochloric acid are removed. The latter two operations are conducted at substantially atmospheric temperature and pressure.

The above process is continued with the continuous introduction of chlorine and the absorber gas effluent to the chlorination reactor (chlorine burner), and of feed gas and chlorination reactor products to the hydrochlorination reactor, respectively. The following chlorides are prepared, separated and recovered in the process in the following amounts per 100 volumes of feed gas:

| | Volumes |
|---|---|
| Vinyl chloride | 27.2 |
| Ethyl chloride | .5 |
| Other chlorides | 6.0 |

I particularly point out and distinctly claim as my invention:

1. An integrated process for preparing and separating vinyl chloride and saturated aliphatic chlorides from starting materials consisting of chlorine and a mixture of acetylene, hydrogen, and other hydrocarbons, which comprises mixing a gaseous mixture of acetylene, hydrogen, and other gaseous hydrocarbons with a mixture of saturated aliphatic chlorides and hydrogen chloride produced in a subsequent reaction step, in a reaction zone in the presence of a catalyst and under conditions of temperature and pressure to induce the reaction of hydrogen chloride and acetylene to form vinyl chloride, separating vinyl chloride and the saturated aliphatic chlorides from hydrogen and unreacted hydrocarbons in a separate absorbing zone, withdrawing the effluent hydrogen and unreactated hydrocarbons to a separate reaction zone and reacting the same with chlorine to produce a mixture of hydrogen chloride and saturated aliphatic chlorides, recycling the hydrogen chloride and saturated aliphatic chlorides to the first reaction step, withdrawing absorbent from the absorbing zone to a desorbing zone, and fractionally desorbing and recovering vinyl chloride and the saturated aliphatic chlorides.

2. The process of claim 1, in which the hydrochlorination step is carried out at 120°–180° C. and at about atmospheric pressure, in the presence of a catalyst comprising barium chloride and mercuric chloride on activated carbon, the products of the hydrochlorination step are passed through an absorber counter-currently to a selective solvent at a temperature sufficiently low to absorb vinyl chloride and saturated aliphatic chlorides, gaseous effluent is passed from the absorber to the chlorination step, chlorides-enriched solvent is passed from the absorber to a desorber, solvent is recycled to the absorber, and separate chloride fractions are separated and recovered in a fractionator.

3. The process of claim 1 in which said gaseous mixture containing acetylene, hydrogen and a plurality of gaseous hydrocarbons has a low methane content.

4. The process of claim 2 in which during the separation of vinyl chloride and other aliphatic chlorides into separate fractions in a fractionator, hydrocarbon components dissolved in said vinyl and other aliphatic chlorides are prepared for fuel gas by separating said hydrocarbon components therefrom and then purifying said separated hydrocarbon components of dissolved hydrogen chloride by passing the same through an absorption column countercurrent to water and thereafter passing through a scrubbing tower countercurrent to an alkaline solution.

5. A continuous process for the substantially total utilization of hydrocarbons in a gaseous mixture and the preparation, separation and recovery of vinyl chloride and other aliphatic chlorides which comprises the steps of initially contacting Griffin-Ediger hydrocarbon cracking process reaction effluent containing acetylene, hydrogen, and a plurality of gaseous hydrocarbons with hydrogen chloride in a hydrochlorination reactor operating at about 140° C. and about 5 p. s. i. g. in the presence of a catalyst comprising barium chloride and mercuric chloride deposited on activated carbon, passing resulting gaseous products comprising vinyl chloride and other aliphatic chlorides, hydrogen and unreacted hydrocarbons to a countercurrent contact absorber operating at about —10° C. and about 3 p. s. i. g. and countercurrently contacting said gaseous products with descending trichloroethylene, removing gaseous effluent from said absorber and passing to a chlorination reactor and therein contacting said gaseous effluent comprising hydrogen and gaseous hydrocarbons with introduced chlorine gas, separating chlorinated products comprising hydrogen chloride and alkyl chlorides and recycling said products to said hydrochlorination reactor, removing chlorides-enriched trichloroethylene from said absorber and passing into and through a surge tank operating at about ambient temperature and super-atmospheric pressure and thence into a still pot operating at substantially atmospheric pressure, therein separating dissolved chlorides as gaseous effluent, recycling stripped trichloroethylene to said absorber, passing said chlorides to a fractionator, removing unreacted acetylenes from said chlorides in said fractionator and recycling said acetylenes to said hydrochlorination reactor, separating butenes from said chlorides in fractionator, purifying said butenes of hydrogen chloride by passing said butenes through a countercurrent contacting absorption column operating at ambient temperature and substantially atmospheric pressure countercurrent to water, thereafter passing said butenes through a countercurrent contact scrubbing tower operating at ambient temperature and substantially atmospheric pressure countercurrent to a dilute water solution of an alkaline material and thereafter recovering said butenes as fuel gas, fractionating in said fractionator vinyl and other aliphatic chlorides present therein into separate fractions, passing said fractions as effluent through an accumulator and consecutively recovering said fractions.

6. The process of claim 5 in which said gaseous mixture containing acetylene, hydrogen and a plurality of gaseous hydrocarbons has a low methane content.

References Cited in the file of this patent

UNITED STATES PATENTS

| 2,213,544 | Brown et al. | Sept. 3, 1940 |
| 2,238,490 | Hasche | Apr. 15, 1941 |
| 2,265,286 | Japs | Dec. 9, 1941 |
| 2,265,509 | Boesler et al. | Dec. 9, 1941 |
| 2,321,472 | Engs et al. | June 8, 1943 |
| 2,538,723 | Fruhwirth et al. | Jan. 16, 1951 |
| 2,552,425 | Halbig | May 8, 1951 |
| 2,642,154 | Woolcock | June 16, 1953 |
| 2,705,732 | Braconier et al. | Apr. 5, 1955 |

OTHER REFERENCES

Rosenquist: Fiat Final Report, No. 867 (pages 1 to 5), Production of Mono-Vinyl Chloride, Technical Industrial Intelligence Branch, U. S. Dept. of Commerce, July 22, 1946.